(12) United States Patent
Gropp et al.

(10) Patent No.: US 11,535,124 B2
(45) Date of Patent: Dec. 27, 2022

(54) VEHICLE SEAT WITH A SEAT PART WHICH CAN BE PIVOTED ABOUT A SINGLE PIVOT AXIS

(71) Applicant: Brose Fahrzeugteile SE & Co. Kommanditgesellschaft, Coburg, Coburg (DE)

(72) Inventors: Jörg Gropp, Böhlen (DE); Gregor Kröner, Bischberg (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 369 days.

(21) Appl. No.: 16/645,031

(22) PCT Filed: Sep. 4, 2018

(86) PCT No.: PCT/EP2018/073655
§ 371 (c)(1),
(2) Date: Mar. 6, 2020

(87) PCT Pub. No.: WO2019/048391
PCT Pub. Date: Mar. 14, 2019

(65) Prior Publication Data
US 2020/0262315 A1 Aug. 20, 2020

(30) Foreign Application Priority Data

Sep. 8, 2017 (DE) ...................... 10 2017 215 913.8

(51) Int. Cl.
*B60N 2/02* (2006.01)
*B60N 2/90* (2018.01)
*B60N 2/18* (2006.01)
*B60N 2/225* (2006.01)
*B60N 2/30* (2006.01)

(52) U.S. Cl.
CPC ......... *B60N 2/0232* (2013.01); *B60N 2/1842* (2013.01); *B60N 2/1857* (2013.01);
(Continued)

(58) Field of Classification Search
CPC .... B60N 2/0232; B60N 2/933; B60N 2/1842; B60N 2/1857; B60N 2/2252;
(Continued)

(56) References Cited

U.S. PATENT DOCUMENTS

| 2003/0184112 A1 | 10/2003 | Furui |
| 2004/0140783 A1 | 7/2004 | Fukuhara et al. |
| 2005/0006920 A1 | 1/2005 | Moriyama et al. |

(Continued)

FOREIGN PATENT DOCUMENTS

| DE | 19960396 C1 | 1/2001 |
| DE | 102004007043 B3 | 6/2005 |

(Continued)

*Primary Examiner* — Mark R Wendell
(74) *Attorney, Agent, or Firm* — Brooks Kushman, P.C.

(57) ABSTRACT

A vehicle seat comprising a seat part, an adjustable backrest part attached to the seat part, and a floor assembly supporting the seat part and arranged on a vehicle floor. The seat part is connected to the floor assembly in a pivotal manner about a first axis, and the backrest part is connected to the seat part in a pivotal manner about a second axis. The vehicle seat has a first adjusting device powered by an electric motor for pivoting the seat part relative to the floor assembly about the first axis and a second adjusting device powered by an electric motor for pivoting the backrest part relative to the seat part about the second axis.

16 Claims, 5 Drawing Sheets

(52) U.S. Cl.
CPC .......... *B60N 2/2252* (2013.01); *B60N 2/305* (2013.01); *B60N 2/3011* (2013.01); *B60N 2/933* (2018.02); *B60N 2002/024* (2013.01); *B60N 2002/0236* (2013.01); *B60N 2205/50* (2013.01)

(58) Field of Classification Search
CPC .................. B60N 2/3011; B60N 2/305; B60N 2002/0236; B60N 2002/024; B60N 2205/50
USPC ....................................................... 296/65.08
See application file for complete search history.

(56) References Cited

U.S. PATENT DOCUMENTS

| | | | |
|---|---|---|---|
| 2013/0093218 A1 | 4/2013 | Yetukuri et al. | |
| 2018/0222350 A1* | 8/2018 | Hirayama | B60N 2/995 |

FOREIGN PATENT DOCUMENTS

| | | | |
|---|---|---|---|
| DE | 102006023176 A1 | | 11/2006 |
| DE | 202007001735 U1 | | 6/2008 |
| DE | 102008028102 A1 | | 12/2009 |
| DE | 102009040921 A1 | | 3/2011 |
| DE | 102010038795 A1 | | 2/2012 |
| DE | 102010038797 A1 | | 2/2012 |
| DE | 102015205100 A1 | | 9/2016 |
| EP | 0481292 B1 | | 8/1994 |
| EP | 1616748 B1 | | 5/2007 |
| FR | 795457 A | | 3/1936 |
| FR | 2326164 A1 | | 4/1977 |
| FR | 2902716 A1 | | 12/2007 |
| FR | 2911305 A1 | | 7/2008 |
| JP | 2009096237 A | | 5/2009 |
| JP | 2018001924 | * | 1/2018 |
| NL | 1036099 C | | 4/2010 |

* cited by examiner

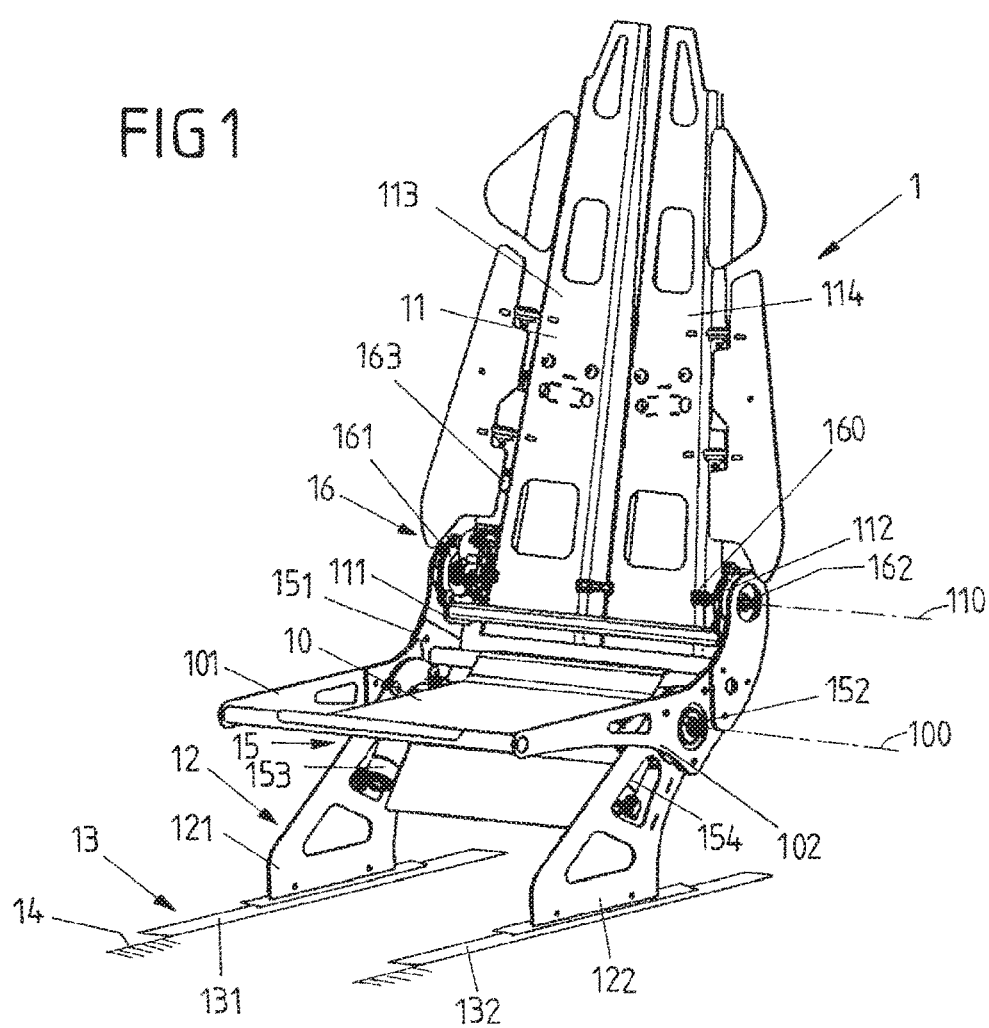

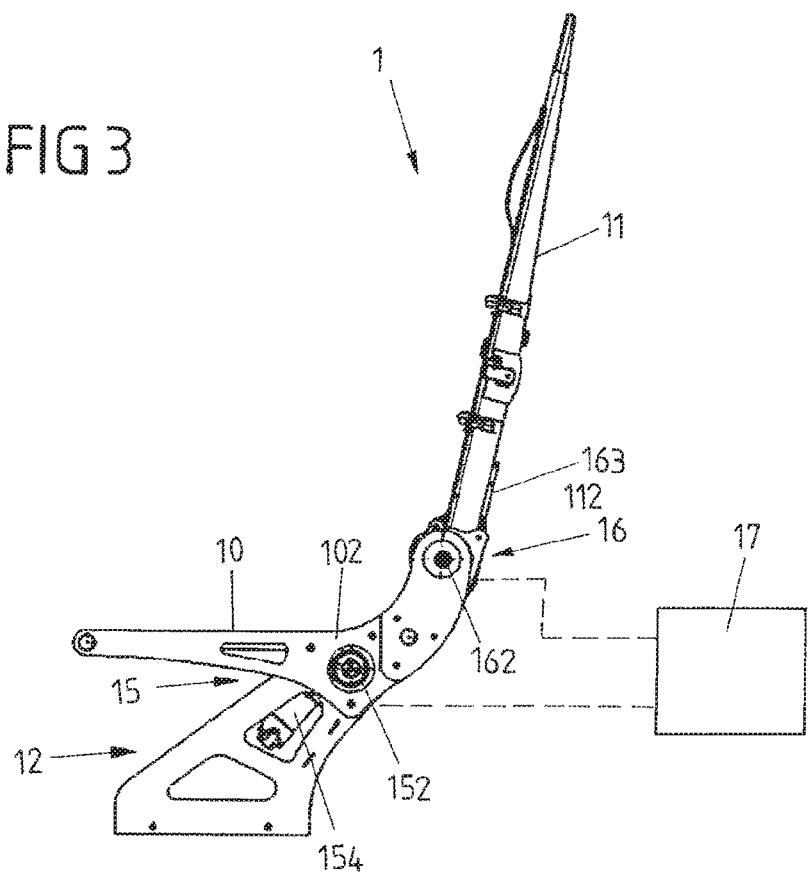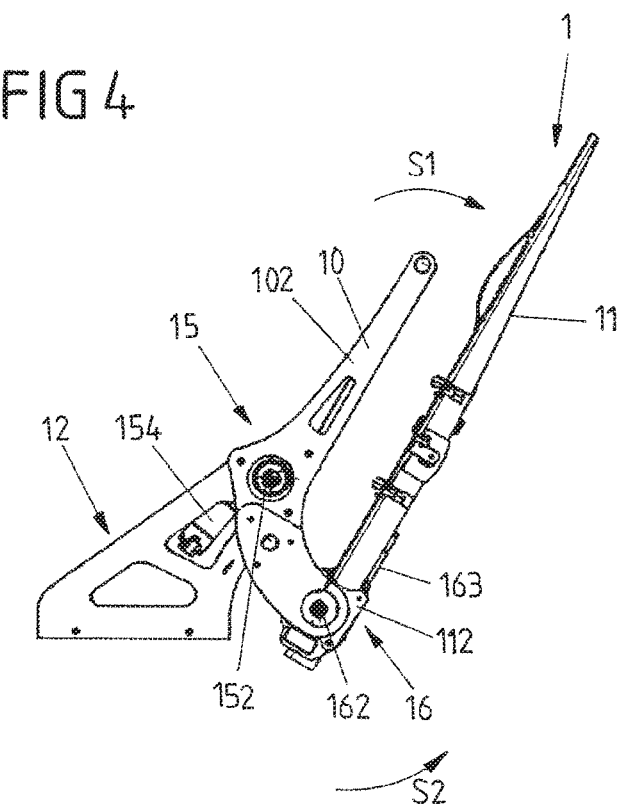

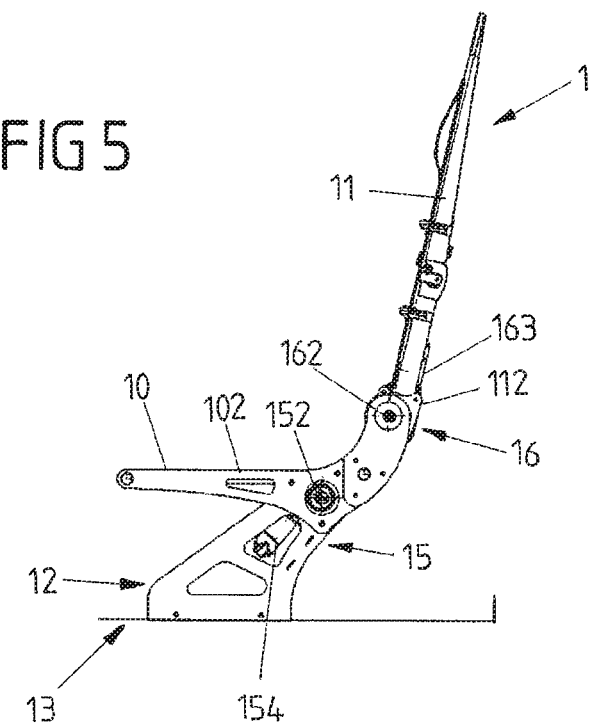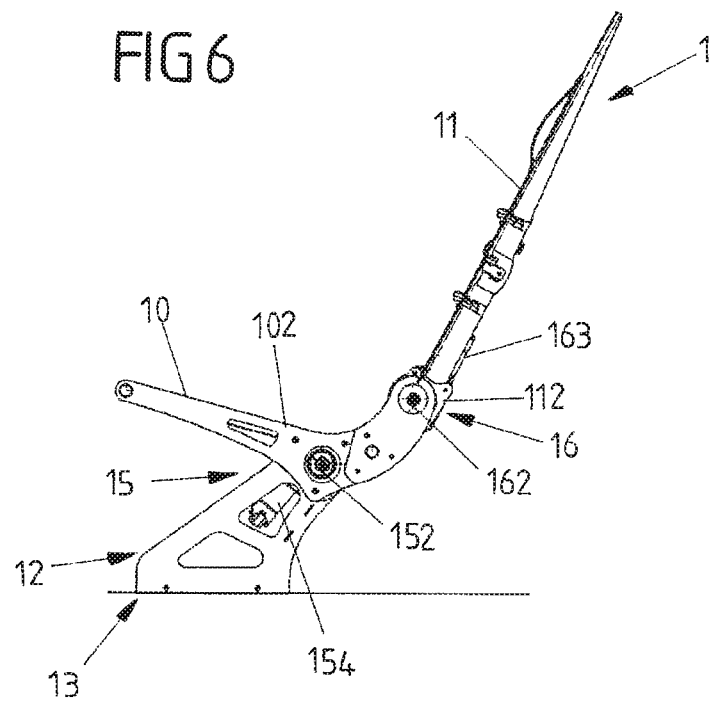

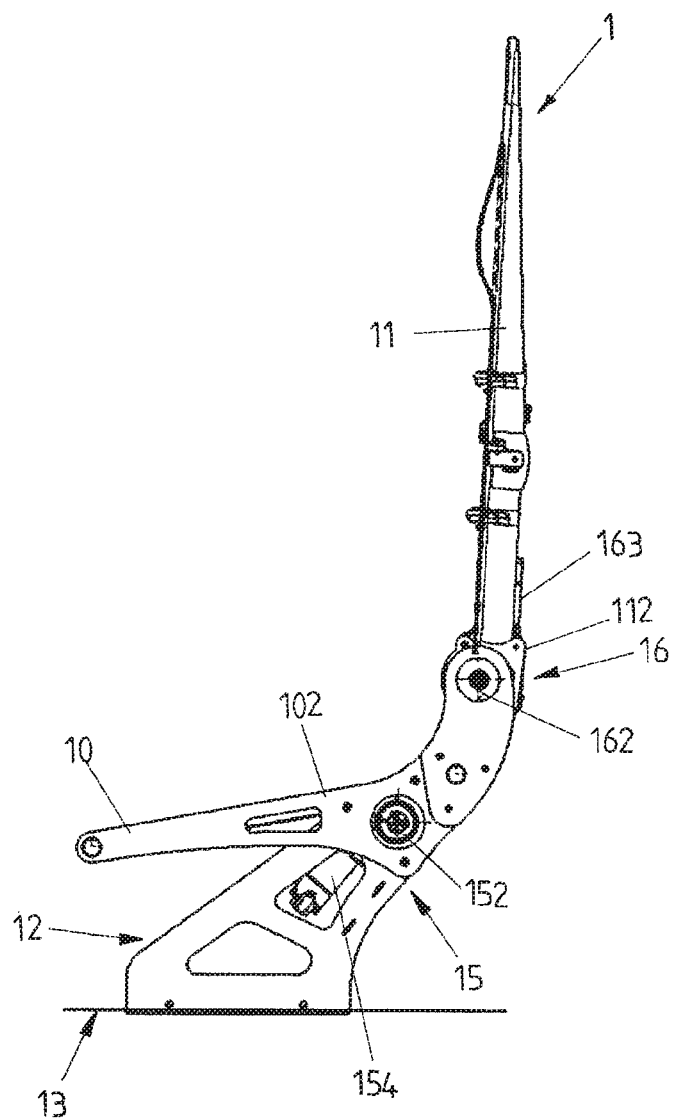

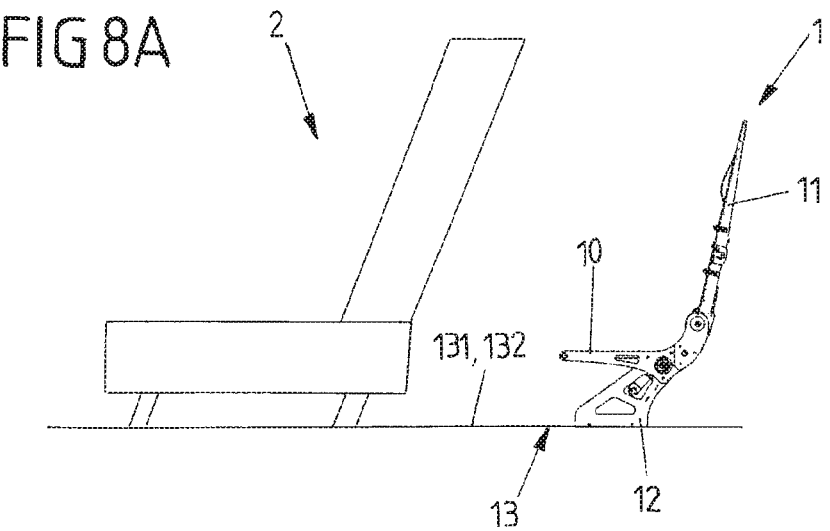
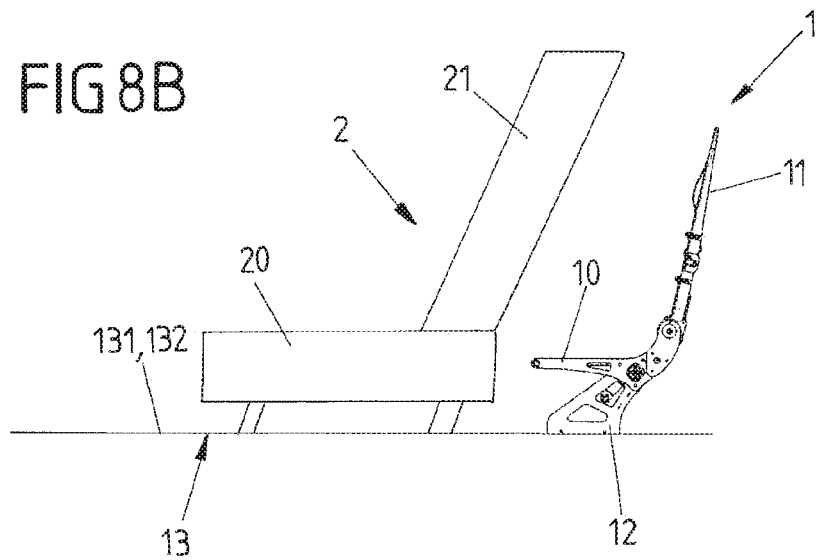
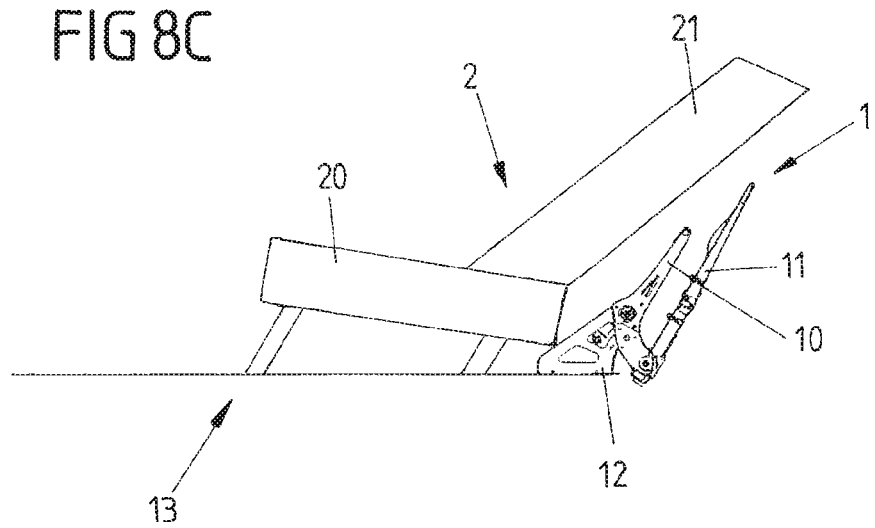

VEHICLE SEAT WITH A SEAT PART WHICH CAN BE PIVOTED ABOUT A SINGLE PIVOT AXIS

CROSS-REFERENCE TO RELATED APPLICATIONS

This application is the U.S. National Phase of PCT/EP2018/073655 filed Sep. 4, 2018, which claims priority to DE 10 2017 215 913.8 filed Sep. 8, 2017, the disclosures of which are hereby incorporated in their entirety by reference herein.

TECHNICAL FIELD

The present disclosure relates to a vehicle seat.

BACKGROUND

Vehicle seats may include a seat part, a backrest part adjustably arranged on the seat part, and a floor assembly which carries the seat part and via which the seat part is to be arranged on a vehicle floor.

The vehicle seat can be configured for example as a rear seat in the second or third row in a vehicle.

In future vehicles, a different adjustability of vehicle seats may be desired in connection with novel interior design concepts. In particular, in connection with what is called autonomous driving a vehicle front seat may be adjustable to a larger extent and may take other positions—beyond the positions known from today's vehicle seats. For example, a vehicle front seat may be shiftable to the rear along a comparatively large adjustment path, and thus may be approached to a rear seat located behind the vehicle front seat and also be brought e.g. into a position approached to a reclining position (so-called relax position) in order to allow the vehicle occupant to have a comfortable, relaxed ride.

Such an adjustability of a vehicle front seat requires sufficient space behind the vehicle front seat to a larger extent. In particular, a rear seat arranged behind the vehicle front seat should not impair the adjustability of the vehicle front seat, which may require to stow the rear seat in a space-saving way in dependence on the posture and position of the vehicle front seat. It should be noted that frequently no large storage space is available behind a rear seat because for example a vehicle interior space is separated from a vehicle cargo space by a bulkhead and thus a rear seat cannot easily be shifted further to the rear.

SUMMARY

One or more objects of the present disclosure may be to provide a vehicle seat which has an adjustment kinematics that for example in a rear seat is favorable for transferring the vehicle seat into a stowage position and provides for stowage of the vehicle seat in a small installation space.

Accordingly, the seat part is pivotally connected to the floor assembly about a first pivot axis and the backrest part is pivotally connected to the seat part about a second pivot axis. The vehicle seat includes a first electromotive adjusting device for pivoting the seat part relative to the floor assembly about the first pivot axis and a second electromotive adjusting device for pivoting the backrest part relative to the seat part about the second pivot axis.

The seat part accordingly is pivotally connected to the floor assembly about a (single) pivot axis and can be adapted in its pivot position relative to the floor assembly via the associated first electromotive adjusting device. The backrest part on the other hand is pivotally arranged on the seat part via a (single) second pivot axis and can be pivoted relative to the seat part via a second electromotive adjusting device. This results in a kinematics in which the seat part—driven by the first adjusting device—can be pivoted about the first pivot axis relative to the floor assembly and thus can be adapted in its position relative to the floor assembly. When the seat part is pivoted about the first pivot axis relative to the floor assembly, the backrest part connected to the seat part and supported by the seat part also is pivoted, wherein driven by the second adjusting device, the pivot position of the backrest part relative to the seat part can be adapted.

As an example, the seat part is pivotable relative to the floor assembly exclusively about the first pivot axis. The adjustment of the seat part relative to the floor assembly thus is exclusively effected by pivoting about the first pivot axis.

Coupling the seat part with the floor assembly in one or more embodiments may be effected via one or more rotary fittings which connect frame parts of the seat part to side parts of the floor assembly.

In this text, rotary fitting is understood to be an electromotively drivable fitting which includes fitting parts that can be pivoted relative to each other in a manner driven by an electric motor. Such a rotary fitting for example can include an eccentric gear unit (wobble gear unit) in which fitting parts are eccentrically mounted relative to each other, for example in that via an external toothing a first fitting part is in engagement with an internal toothing of another, second fitting part and revolves eccentrically relative to the second fitting part so as to pivot the fitting parts relative to each other.

A rotary fitting for example can be configured in the manner described in DE 10 2010 038 795 A1, DE 10 2010 038 797 A1 or DE 10 2008 028 102 A1, whose contents will be incorporated herein by reference.

For example, in one embodiment, a first frame part of the seat part can be connected to a first side part of the floor assembly and a second frame part of the seat part, which is spaced apart from the first frame part along the first pivot axis, can be connected to a second side part of the floor assembly, wherein a rotary fitting each acts between a frame part and an associated side part so that the seat part is pivotally connected to the floor assembly on both sides via its frame parts.

To ensure a synchronous adjustment of the rotary fittings, the rotary fittings coupling the seat part with the floor assembly are connected to each other for example via a first shaft is extended along the first pivot axis. In particular, drive assemblies of the rotary fittings are synchronously driven via the shaft so that the rotary fittings on both sides of the seat part are jointly adjusted for pivoting the seat part relative to the floor assembly.

For driving the first adjusting device, one or more electromotive driving devices can be provided. For example, in one embodiment, an electromotive driving device can be arranged in the region of each rotary fitting, wherein the respective electromotive driving device acts on the shaft via a suitable transmission and thus drives the shaft for rotation. In general, in one embodiment, two electromotive driving devices thus are provided for adjusting the rotary fittings of the first adjusting device, which may be advantageous to provide for a sufficient torque for adjusting the seat part relative to the floor assembly also in a load case, i.e. for example when an occupant is sitting on the seat part.

Due to the fact that two electromotive driving devices are provided for adjusting the rotary fittings of the first adjusting device, each electromotive driving device can be configured with half the power so that driving devices of comparatively small overall size can be used.

In principle, however, it is also conceivable and possible to use merely one electromotive driving device or more than two electromotive driving devices for driving the rotary fittings of the first adjusting device.

The one or more electromotive driving devices for driving the rotary fittings of the first adjusting device for example can be stationarily arranged on the floor assembly so that when the seat part is pivoted, the driving devices are not pivoted as well, but remain stationary on the floor assembly, for example on side parts of the floor assembly.

In one embodiment, the second adjusting device, via which the backrest part is pivotally connected to the seat part, also includes one or more rotary fittings via which the backrest part is pivotally connected to frame parts of the seat part about the second pivot axis. When two rotary fittings are provided for bilaterally coupling the backrest part with the seat part, the same can be coupled with each other for example via a shaft extended along the second pivot axis so that the rotary fittings can be actuated jointly and synchronously—driven via an electromotive driving device for pivoting the backrest part relative to the seat part.

For example, merely one electromotive driving device can be used for driving the second adjusting device via which the backrest part is pivotally coupled with the seat part. It is also conceivable and possible, however, to use two (or more) electromotive driving devices.

The one or more electromotive driving devices for driving the rotary fittings, via which the backrest part is coupled with the seat part, for example can be stationarily arranged on the backrest part so that when the backrest part is pivoted relative to the seat part, the driving devices can be pivoted with the backrest part.

In one embodiment, the vehicle seat includes a control device via which the first adjusting device for pivoting the seat part with respect to the floor assembly and the second adjusting device for pivoting the backrest part with respect to the seat part can be actuated in a manner matched to each other. In this way it is possible to move the vehicle seat between defined positions, for example between a position of use and a stowage position. In the position of use, the seat part for example is at least approximately horizontally aligned, and the backrest part is put up relative to the seat part, but for example slightly tilted backwards in order to create a comfortable seating position for a user. In the stowage position, on the other hand, the seat part can be aligned approximately vertically, while the backrest part is approached to the seat part and extends approximately parallel to the seat part. In the stowage position, the space occupied by the vehicle seat thus is smaller than in the position of use.

Via the control device, an adjustment of the vehicle seat for example can also be matched to an adjusting operation on other vehicle seats. A transfer of the vehicle seat into its stowage position can be effected for example when a front seat arranged in front of the vehicle seat is approached to the vehicle seat in order to provide more space for the front seat. The adjustment of the vehicle seat here can be effected automatically during an adjusting operation of the front seat and in dependence on an adjustment position of the front seat.

Via the floor assembly, the vehicle seat is to be arranged on a vehicle floor. The floor assembly can provide for a height adjustability of the seat part. It can also be provided to connect the floor assembly to the vehicle floor via a longitudinal adjusting device so that the vehicle seat is longitudinally adjustable.

A vehicle seat as described above can realize a rear seat in the second or third row in a vehicle. However, a kinematics as described here for example can also be used in a vehicle front seat in the first row.

BRIEF DESCRIPTION OF THE DRAWINGS

The idea underlying the invention will be explained in detail below with reference to the exemplary embodiment illustrated in the Figures, in which:

FIG. 1 shows a view of an exemplary embodiment of a vehicle seat, comprising a seat part pivotally connected to a floor assembly about a first pivot axis and a backrest part pivotally connected to the seat part about a second pivot axis, in a position of use;

FIG. 2 shows a view of the vehicle seat in a stowage position;

FIG. 3 shows a side view of the vehicle seat in the position of use;

FIG. 4 shows a side view of the vehicle seat in the stowage position;

FIG. 5 shows a view of the vehicle seat in the position of use;

FIG. 6 shows a side view of the vehicle seat in a comfort position;

FIG. 7 shows a side view of the vehicle seat in an exit position;

FIG. 8A shows a view of the vehicle seat, together with a front seat;

FIG. 8B shows a view of the vehicle seat with a front seat approached to the vehicle seat; and FIG. 8C shows a view of the vehicle seat in the stowage position, with the front seat approached to the vehicle seat in a relax position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a vehicle seat known from DE 199 60 396 C1 a seat pan is arranged on an adjusting device comprising a rocker in order to provide for a tilt adjustment in small angular steps.

In a vehicle seat known from EP 0 481 292 B1 a tilt adjustment of a seat part about a pivot axis leads to a coupled tilt adjustment of a backrest.

FIGS. 1 to 7 show an exemplary embodiment of a vehicle seat 1, which includes a seat part 10 and a backrest part 11 arranged on the seat part 10. The seat part 10 provides a seating surface for a vehicle occupant in the manner of a seat pan and is to be connected to a vehicle floor 14 via a floor assembly 12.

Via a first adjusting device 15, the seat part 10 is pivotable relative to side parts 121, 122 of the floor assembly 12 about a first pivot axis 100. For this purpose, the side parts 121, 122 of the floor assembly 12 each are connected to lateral frame parts 101, 102 of the seat part 10 via a rotary fitting 151, 152 such that by actuating the rotary fittings 151, 152 the seat part 10 can be pivoted relative to the floor assembly 12 about the pivot axis 100.

As shown for example in FIG. 2, the rotary fittings 151, 152 are connected to each other via a shaft 150. Via the shaft 150, in particular drive assemblies of the rotary fittings 151, 152 are coupled with each other such that by rotating the shaft 150, the drive assemblies of the rotary fittings 151, 152 are actuated synchronously and fitting parts of the rotary fittings 151, 152 thereby are jointly rotated relative to each other for pivoting the seat part 10 about the pivot axis 100.

In the illustrated exemplary embodiment an electromotive driving device 153, 154 is arranged in the region of each side part 121, 122 of the floor assembly 12, which serves for electromotively driving the shaft 150 and hence the rotary fittings 151, 152. Thus, the adjusting device 15 includes two electromotive driving devices 153, 154 via which the rotary fittings 151, 152 can be driven so as to pivot the seat part 10.

Due to the fact that two electromotive driving devices 153, 154 are used, which for example can each be operatively connected to the shaft 150 via a suitable transmission, the driving devices 153, 154 can each be configured with half the power (as compared to an embodiment in which only one single driving device is used for adjusting the seat part 10), which provides for using driving devices 153, 154 of comparatively small size.

In the illustrated exemplary embodiment the driving devices 153, 154 are stationarily arranged on the side parts 121, 122 of the floor assembly 12 and thus are not pivoted when the seat part 10 is pivoted, but remain stationary at the side parts 121, 122 of the floor assembly 12.

The backrest part 11 is mounted on the lateral frame parts 101, 102 of the seat part 10 about a pivot axis 110. For this purpose, rotary fittings 161, 162 of an adjusting device 16 on both sides of the backrest part 11 couple adapter parts 111, 112 of the backrest part 11 with the lateral frame parts 101, 102 of the seat part 10 so that by rotating the rotary fittings 161, 162, the backrest part 11 can be pivoted relative to the seat part 10.

The rotary fittings 161, 162 of the adjusting device 16 are connected to each other via a shaft 160 which is guided through surface portions 113, 114 of the backrest part 11, as this is shown for example in FIG. 1.

The adjusting device 16 includes an electromotive driving device 163 which is stationarily arranged on the backrest part 11 and is operatively connected with the shaft 160 via a suitable transmission so that the rotary fittings 161, 162 driven by the driving device 163 can be actuated in order to pivot the backrest part 11 relative to the seat part 10 about the pivot axis 110.

This results in a kinematics in which the seat part 10 is pivotable relative to the floor assembly 12 about a first pivot axis 100 and the backrest part 11 is pivotable relative to the seat part 10 about a parallel second pivot axis 110 spaced apart from the first pivot axis 100. The floor assembly 12 here carries the seat part 10. The seat part 10 is exclusively pivotable relative to the floor assembly 12 about the first pivot axis 100, but not otherwise movable relative to the floor assembly 12. In particular, the swivel movement of the seat part 10 relative to the floor assembly 12 is not superimposed by other components of movement of the seat part 10 relative to the floor assembly 12.

Driven by the adjusting devices 15, 16, the vehicle seat 1 can be pivoted between different positions. Swivel movements of the seat part 10 and the backrest part 11 may be matched to each other in that the adjusting devices 15, 16 are actuated by a common control device 17 (see FIG. 3) in order to shift the vehicle seat 1 between defined positions, for example a position of use (FIG. 3) and a stowage position (FIG. 4).

In the position of use (FIG. 3) the seat part 10 extends approximately horizontally and thus provides a seating surface for a user. The backrest part 11 on the other hand is erected relative to the seat part 10 and inclined slightly backwards so that a comfortable seating position is obtained for a user.

By pivoting the seat part 10 in a swivel direction S1 and by correspondingly pivoting the backrest part 11 relative to the seat part 10 in a swivel direction S2, the vehicle seat 1 can be transferred into its stowage position, as this is shown in FIG. 4. In the stowage position, the seat part 10 is approximately perpendicularly directed upwards, and the backrest part 11 is approached to the seat part 10 and extends approximately parallel to the seat part 10.

Other positions also are conceivable and possible, and, as shown in FIG. 6, the vehicle seat 1 for example can be pivoted into a comfort position with an inclined seat part 10 and with a backrest part 11 inclined further to the rear with respect to the position of use (FIG. 5). Or the vehicle seat 1, as shown in FIG. 7, can be brought into an exit position in which the seat part 10 is inclined slightly forwards and the backrest part 11 approximately is in a vertical position in order to make it easier for a user to get out of the vehicle.

A vehicle seat 1 as described above can be used in particular as a rear seat in the second or third row in a vehicle. An adjustment of the vehicle seat 1 in particular into its stowage position here can be matched to an adjusting movement of another vehicle seat 2, as this is shown in FIGS. 8A to 8C.

The vehicle seat 1 can be arranged behind a vehicle front seat 2, which is adjustable to the rear by a comparatively large distance and in a rear position is movable into a relax position, as this is shown in FIG. 8C. To increase the space available for the vehicle front seat 2 to the rear, the vehicle seat 1 can be moved into its stowage position, as this is shown in FIG. 8C, so that the vehicle seat 1 can be folded away when the vehicle front seat 2 is shifted to the rear.

Such a scenario can be expedient in particular for novel interior design concepts, in particular in connection with future autonomously operated vehicles, in order to allow a relaxed seating position for a user on a vehicle front seat 2 in a vehicle in an autonomous driving mode.

As shown in FIG. 1, the floor assembly 12 carries the seat part 10 and is arranged on a vehicle floor 14. The floor assembly 12 can longitudinally shiftably be arranged on the vehicle floor 14 via a longitudinal adjusting device 13 and for this purpose be shiftably guided on guide rails 131, 132 of the longitudinal adjusting device 13 so that the longitudinal position of the vehicle seat 1 can be adapted.

It is, however, also conceivable and possible to stationarily and non-shiftably fix the vehicle seat 1 to the vehicle floor 14 via the floor assembly 12.

The idea underlying the invention is not limited to the exemplary embodiments described above, but can also be realized in a completely different way.

A kinematics as described here can also be used in particular for a vehicle front seat.

Due to the fact that electromotive adjusting devices are provided for pivoting the seat part relative to the floor assembly on the one hand and for pivoting the backrest part relative to the seat part on the other hand, the vehicle seat is flexibly adjustable between different positions. The result in particular is a biaxial swivel kinematics in which the seat part is adjustable relative to the floor assembly by means of a pure swivel movement and pivotally carries the backrest part.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 vehicle seat
10 seat part
100 pivot axis
101, 102 frame part
11 backrest part
110 pivot axis
111, 112 adapter part
113, 114 surface portion
12 floor assembly
121, 122 side part
13 longitudinal adjusting device
131, 132 guide rail
14 vehicle floor
adjusting device
150 shaft
151, 152 rotary fitting
153, 154 driving device (electric motor)
16 adjusting device
160 shaft
161, 162 rotary fitting
163 driving device (electric motor)
17 control device
2 vehicle front seat
S1, S2 swivel movement While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle seat comprising:
a seat part;
a backrest part adjustably arranged to the seat part;
a floor assembly carrying the seat part, wherein the floor assembly is configured to couple the seat part to a vehicle floor, wherein the seat part is pivotally connected to the floor assembly about a first pivot axis and the backrest part is pivotally connected to the seat part about a second pivot axis, wherein the floor assembly includes side parts;
a first electromotive adjusting device configured to pivot the seat part relative to the floor assembly about the first pivot axis, wherein the first electromotive adjusting device includes two first rotary fittings each spaced apart from each other along the first pivot axis and pivotally connect frame parts of the seat part to the side parts;
a second electromotive adjusting device configured to pivot the backrest part relative to the seat part about the second pivot axis; and
a first shaft extending along the first pivot axis and connecting each of the two first rotary fittings to one another, wherein the first shaft jointly adjusts the two first rotary fittings, wherein the first electromotive adjusting device includes two first electromotive driving devices each configured to rotate the first shaft.

2. The vehicle seat of claim 1, wherein the seat part is pivotable relative to the floor assembly exclusively about the first pivot axis.

3. The vehicle seat of claim 1, wherein a rotary fitting of the first two rotary fittings pivotally connects a frame part of the frame parts to a side part of the side part about the first pivot axis.

4. The vehicle seat of claim 1, wherein the first electromotive adjusting device includes a first electromotive driving device configured to rotate the first shaft.

5. The vehicle seat of claim 1, wherein the second electromotive adjusting device includes a second rotary fitting, wherein the second rotary fitting pivotally connects the backrest part to a frame part of the seat part-about the second pivot axis.

6. The vehicle seat of claim 1, wherein the second electromotive adjusting device includes two second rotary fittings each spaced apart from one another along the second pivot axis, wherein two second rotary fittings pivotally connect the backrest part to frame parts of the seat part.

7. The vehicle seat of claim 6, further comprising a second shaft extending along the second pivot axis and connecting each of the two second rotary fittings to one another, wherein the second shaft jointly adjusts the second rotary fittings.

8. The vehicle seat of claim 7, wherein the second electromotive adjusting device includes a second electromotive driving device configured to rotate the second shaft.

9. The vehicle seat of claim 1, further comprising a control device configured to provide matched actuation between the first electromotive adjusting device and the second electromotive adjusting device.

10. The vehicle seat of claim 1, further comprising a longitudinal adjusting device arranged to the vehicle floor and coupled to the floor assembly, wherein the longitudinal adjusting device is configured to translate the floor assembly with respect to the vehicle floor.

11. A vehicle seat for use in a vehicle provided with a floor, the vehicle seat comprising:
a floor assembly configured to be coupled to the floor, the floor assembly including side parts;
a seat portion configured to support an occupant and pivotally connected to the floor assembly about a first pivot axis;
a backrest pivotally connected to the seat portion about a second pivot axis;
a first adjusting device configured to pivot the seat portion relative to the floor assembly about the first pivot axis, wherein the first adjusting device includes two first rotary fittings each spaced apart from each other along the first pivot axis and pivotally connect frame parts to the side parts;
a second adjusting device configured to pivot the backrest about the second pivot axis; and
a first shaft extending along the first pivot axis and connecting each of the two first rotary fittings to one another, wherein the first shaft jointly adjusts the two first rotary fittings, wherein the first electromotive adjusting device includes two first electromotive driving devices each configured to rotate the first shaft.

12. The vehicle seat of claim 11, wherein the second adjusting device includes a second rotary fitting pivotally connecting the frame part to the backrest.

13. The vehicle seat of claim 12, wherein the seat portion is configured to pivot between a use position and a stowage position, wherein when the seat portion is in the stowage position, the second rotary fitting is disposed closer to the floor than the first rotary fitting.

14. The vehicle seat of claim 13, wherein as the seat portion moves from the use position to the stowage position, the seat portion moves towards the backrest.

15. The vehicle seat of claim 14, wherein as the seat portion moves from the use position to the stowage position, the backrest moves towards the seat portion.

16. The vehicle seat of claim 11, further comprising a control device configured to provide signals to the first adjusting device and the second adjusting device so that the seat portion pivots about the first pivot axis as the backrest pivots about the second pivot axis.

* * * * *